(12) United States Patent
Graef et al.

(10) Patent No.: US 12,206,318 B2
(45) Date of Patent: Jan. 21, 2025

(54) ELECTRIC MACHINE WITH A CAN, AND STATOR FOR AN ELECTRIC MACHINE

(71) Applicant: Dr. Ing. h.c. F. Porsche Aktiengesellschaft, Stuttgart (DE)

(72) Inventors: Rolf Graef, Kornwestheim (DE); Florian Braunbeck, Leinfelden-Echterdingen (DE); Tobias Schmack, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 307 days.

(21) Appl. No.: 17/701,984

(22) Filed: Mar. 23, 2022

(65) Prior Publication Data
US 2022/0399786 A1 Dec. 15, 2022

(30) Foreign Application Priority Data

Jun. 10, 2021 (DE) .................... 10 2021 115 008.6

(51) Int. Cl.
*H02K 9/197* (2006.01)
(52) U.S. Cl.
CPC .................................. *H02K 9/197* (2013.01)
(58) Field of Classification Search
CPC ............ H02K 9/197; H02K 9/20; H02K 9/22; H02K 9/24; H02K 9/19; H02K 9/16; H02K 9/12; H02K 9/10; H02K 9/08; H02K 9/04
See application file for complete search history.

(56) References Cited

U.S. PATENT DOCUMENTS

| | | | |
|---|---|---|---|
| 5,233,248 A * | 8/1993 | Kawamura | H02K 5/136 310/156.28 |
| 10,326,329 B2 | 6/2019 | Hudec | |
| 2020/0007000 A1* | 1/2020 | Berendes | H02K 5/128 |
| 2021/0218316 A1 | 7/2021 | Ness | |

FOREIGN PATENT DOCUMENTS

| | | |
|---|---|---|
| DE | 102008019608 | 10/2009 |
| DE | 102009037655 | 2/2011 |
| DE | 102009047454 A1 | 6/2011 |
| DE | 102018201626 | 8/2019 |

OTHER PUBLICATIONS

German Search Report dated Jan. 20, 2022.

* cited by examiner

*Primary Examiner* — Nguyen Tran
(74) *Attorney, Agent, or Firm* — Gerald E. Hespos; Michael J. Porco

(57) ABSTRACT

An electric machine has a rotor and a stator defined by a stator laminated core (15). The rotor and the stator are separated from one another by a can (20) for the cooling of the stator using a liquid coolant. The electric machine has a stator component (100) formed as a single piece and composed of the stator laminated core (15) and of a plastics workpiece (10) molded thereon. The plastics workpiece (10) is formed as the can (20).

13 Claims, 3 Drawing Sheets

ELECTRIC MACHINE WITH A CAN, AND STATOR FOR AN ELECTRIC MACHINE

CROSS REFERENCE TO RELATED APPLICATION

This application claims priority under 35 USC 119 to German Patent Appl. No. 10 2021 115 008.6 filed on Jun. 10, 2021, the entire disclosure of which is incorporated herein by reference invention relates to an electric machine having a can, to a stator for an electric machine, and to a method for producing a stator component.

BACKGROUND

The electric motor plays a central role in electric drivetrains of hybrid, fuel-cell and electric vehicles. The stator of an electric motor is commonly composed of a large number of individual electrical sheets that are stacked one on top of the other and connected to one another to form a laminated core. Copper windings are laid into the grooves of this laminated core, and the copper windings generate the magnetic field. The demands on this laminated core arise from the design of the motors but also from the design of the housing into which the laminated core ultimately is installed.

Various winding techniques are known for the windings in the stator of the electric motor of an electric vehicle. In the case of hairpin technology, individual bars are inserted into the grooves of the stator laminated core. The individual bars subsequently are deformed and, at the ends, connected typically by laser welding to form one continuous winding called a winding head. Primarily short U-shaped or V-shaped individual segments that are reminiscent of hairpins are used for this purpose, and hence such bar windings also are referred to as hairpin conductors. Bar windings have the advantage that they can be produced fully automatically. The bars commonly have a rectangular cross section and are inserted into correspondingly shaped grooves. Adequate insulation of the copper conductors (hairpins) with respect to the stator laminated core must be ensured. In relation to the use of individual wires, such as are commonly used for the winding of coils, a higher degree of filling of the grooves with copper is possible, such that higher levels of machine power can be realized in a smaller structural space.

High heat losses however also occur in the case of a high level of motor power. Thus, it is necessary for the windings of the stator to be cooled directly to prevent damage to the electric motor. A liquid coolant commonly is used for this purpose and flows around the windings. Cutouts for conducting coolant may be provided in the bar segments, or the stator laminated core may be equipped with pipelines. Furthermore, in the case of the windings being cooled directly by a liquid coolant, a can is required for separating the stator and rotor to prevent coolant from being able to enter the rotor.

Owing to the increasing market share of electromobility in recent years, however, the challenges in developing inexpensive electric motors of high efficiency and quality have increased. In particular, a highly efficient electric motor can make it possible to achieve a longer range of an electric vehicle. Furthermore, changes to the production processes of electric motors are necessary to provide automated production methods that are optimized in terms of value creation, for an ever-increasing demand for electric vehicles. Furthermore, environmental aspects must be taken into consideration, for example to increase the recyclability of the individual components of an electric motor.

DE 10 2018 201 626 A1 describes an assembly for an electric motor of a pump having a magnetically conductive hollow cylindrical stellate body which that has multiple radially outwardly projecting and axially extending teeth on the outer side. Each tooth receives a ring coil of a winding. An insulating structure made that is magnetically neutral and electrically insulating is formed on the stellar body.

DE 10 2008 019 608 A1 describes an insulating carrier composed of an inner cylindrical hollow body for receiving the rotor of an electric motor. The insulating carrier has an encircling groove on its outer side for receiving coil windings.

U.S. Pat. No. 10,326,329 describes a pump with a canned motor that has a stator with an internal rotor arranged therein. The stator and the internal rotor are separated from one another in liquid-tight fashion by a can arranged between the stator and internal rotor. The can is equipped with conical ribs that engage in positively locking fashion into the stator.

US 2021/0218316 A1 describes an electric motor with a can between stator and rotor. The can is formed from a ferritic material.

It is an object of the invention to create an electric machine with a can, where the electric machine is distinguished by a compact construction and can be produced in automated and inexpensive fashion.

SUMMARY OF THE INVENTION

A first aspect of the invention relates to an electric machine having a rotor and a stator that comprises a stator laminated core. The rotor and the stator are separated from one another by a can for cooling of the stator with a liquid coolant. The electric machine comprises a stator component formed as a single piece and composed of the stator laminated core and of a plastics workpiece molded thereon. The plastics workpiece is the can.

The plastics workpiece of some embodiments is composed of a magnetically neutral and electrically insulating plastic. Epoxy resins are particularly suitable here owing to their high mechanical strength, and can be molded onto the stator laminated core by an injection molding process or a transfer molding process.

Plural insulating sleeves for receiving conductor bars may surround an outer surface of the can in ring-shaped fashion.

The insulating sleeve may enclose a groove for receiving the conductor bar.

In a further embodiment, the insulating sleeve has two side walls that are connected at their lower end edges to the outer surface of the can. One outer wall may be connected to the upper end edges of the side walls, and the side walls and outer walls collectively form the groove.

Segments of the stator laminated core may be arranged in the intermediate spaces between the adjacent insulating sleeves.

In a further embodiment, an end disk is provided in the upper end region and/or in the lower end region of the can. The end disk may be connected integrally or unitarily to the outer surfaces of the insulating sleeves and/or to the outer surface of the can. The end disk may have recesses and/or openings for the installation and fixing of the conductor tracks.

The invention also relates to a stator for an electric machine, having a stator laminated core. The stator of some embodiments comprises a stator component formed as a single piece composed of the stator laminated core and of a plastics workpiece molded thereon. The plastics workpiece of this embodiment is or comprises the can.

In one embodiment, the plastics workpiece is composed of a magnetically neutral and electrically insulating plastic and is molded onto the stator laminated core by an injection molding process or a transfer molding process.

The invention also relates to a method for producing a stator component. In accordance with the method, a stator laminated core is overmolded with a plastic composed of a magnetically neutral and electrically insulating plastic by an injection molding process or a transfer molding process in a tool such that a plastics workpiece is connected to the stator laminated core. The plastics workpiece forms a can and insulating sleeves formed on can for conductor tracks.

The invention is explained in more detail below with reference to an exemplary embodiment illustrated in the drawing.

Additional features, aspects and advantages of the invention or its exemplary embodiments will become apparent from the detailed description in conjunction with the claims.

DETAILED DESCRIPTION

Figure 1:
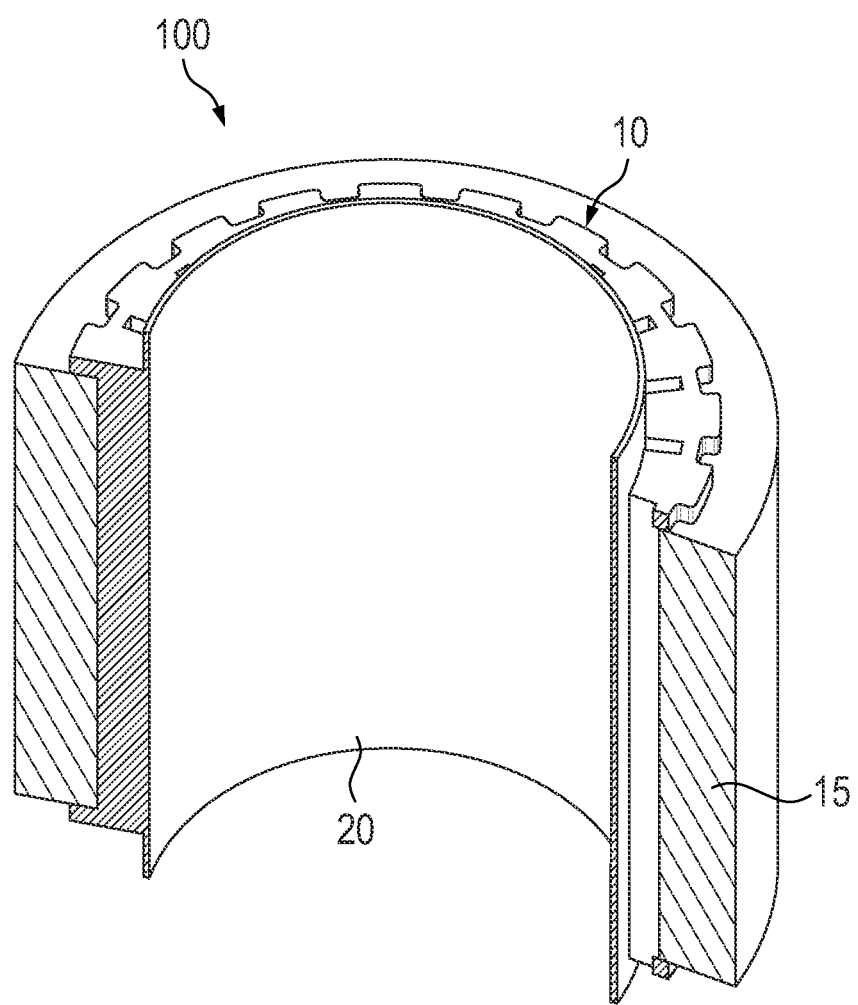
FIG. 1 is a schematic perspective view of a stator component according to the invention composed of a laminated core and a plastics workpiece for an electric machine.

FIG. 1 is a schematic illustration of a first embodiment of a stator component 100 for a stator of an electric machine, in particular of an electric motor. The stator component 100 is composed of a plastics workpiece 10 and a stator laminated core 15. The plastics workpiece 10 comprises a can 20, insulating sleeves 30 and an upper end disk 40 and/or a lower end disk 42. The stator component 100 is a component of a stator of an electric machine (not illustrated in any more detail here). The electric machine comprises the stator and a rotor. The rotor is arranged in a receiving space formed by the stator. The electric machine may be used as a traction electric motor in an electric vehicle.

The stator laminated core 15 is placed into a tool and is then overmolded with plastic by way of an injection molding process or a transfer molding process to from the plastics workpiece 10. The stator component 10 is thus a composite part composed of the stator laminated core 15 and the plastics workpiece 10 fixedly connected thereto by overmolding. The plastics workpiece 10 is composed of a magnetically neutral and electrically insulating plastic, for example PA (polyamide), PP (polypropylene) and/or PS (polystyrene).

Figure 2:
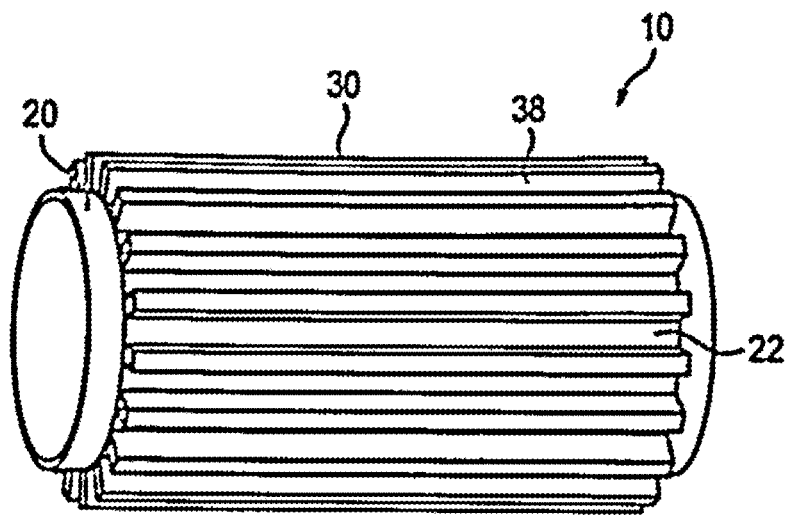
FIG. 2 is a schematic perspective view of the plastics work piece composed of a can with integrally formed insulating sleeves.

As illustrated in FIG. 2, the plastics workpiece 10 has a hollow cylindrical can 20 which, in the assembled state of the electric machine, is arranged in an air gap between the rotor and the stator and separates the stator from the rotor. This is necessary if the stator is cooled using a liquid coolant. Insulating sleeves 30 are formed on an outer surface 22 of the can 20 and can receive conductor bars (hairpins), which in some embodiments are composed of copper. The insulating sleeves of the illustrated embodiment surround the outer surface 22 of the can 20 in ring-shaped fashion and are directed radially outward.

Figure 3:
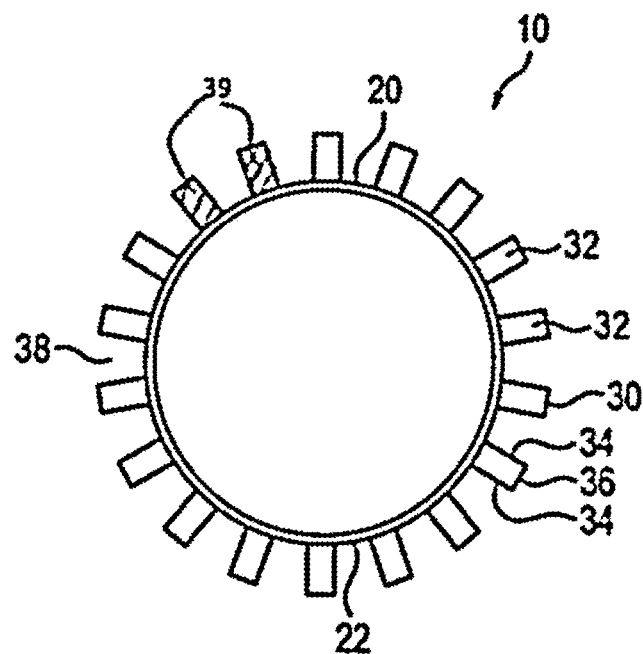
FIG. 3 is a schematic cross-sectional view of the plastics workpiece of FIG. 2.

As illustrated in FIG. 3, an insulating sleeve 30 encloses a groove 32 with a rectangular cross section for receiving a conductor bar or track 39 that also is of rectangular cross section, and extends parallel to the longitudinal axis of the can 20. Each insulating sleeve 30 has two side walls 34 that are connected at their inner end edges to the outer surface 22 of the can 20. One outer wall 36 is connected to the outer end edges of the side walls 34 so that the side walls 34 and the outer wall 36 collectively form the groove 32 for the insertion of a conductor bar or track 39. Formations for the throughflow of a coolant may also be provided in the grooves 32. It is however also possible for the conductor bars 39 to be provided with formations for a coolant. The segments of the stator laminated core 15 (not illustrated in any more detail here) are arranged in the intermediate spaces 38 between the insulating sleeves 30.

Figure 4:
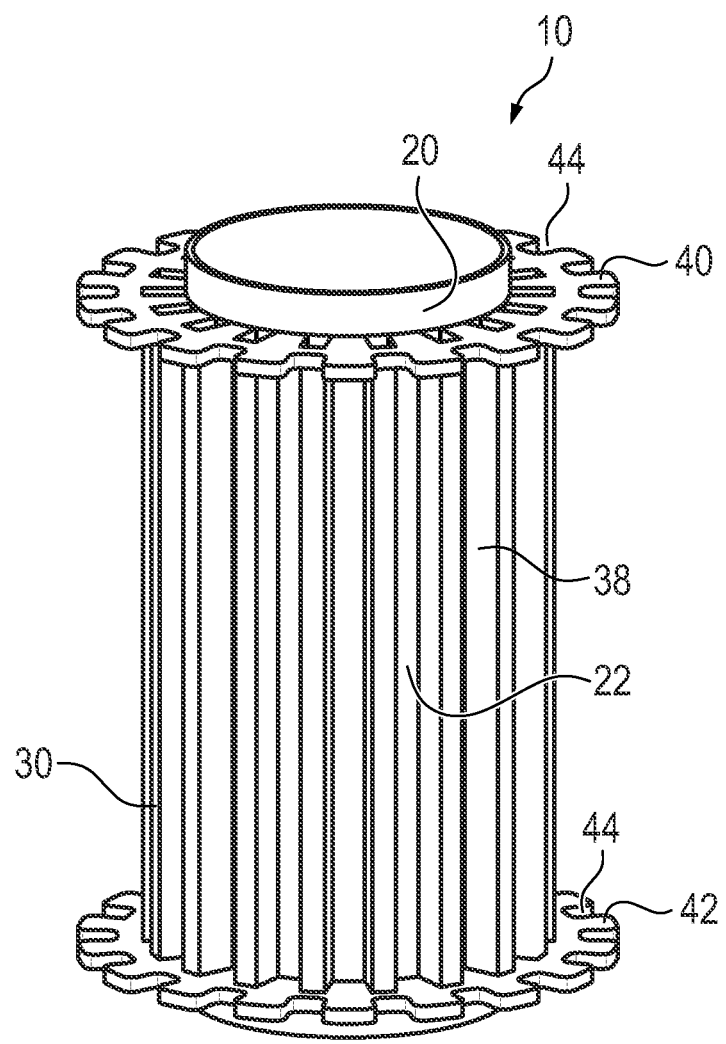
FIG. 4 is a schematic perspective view of the plastics workpiece of FIG. 2 with end disks and insulating sleeves formed thereon.

FIG. 4 illustrates the plastics workpiece 10 with the upper end disk 40 and the lower end disk 42. The upper end disk 40 is arranged in the upper end region of the can 20, and the lower end disk 42 is arranged in the lower end region of the can 20. In particular, the upper end disk 40 and the lower end disk 42 are identical so that the stator component 100 is of symmetrical construction. It is however conceivable for the upper end disk 40 and the lower end disk 42 to be designed differently from one another. The plastics workpiece 10 of some embodiments may have only one end disk 40.

The end disks 40, 42 are annular and are formed on the outer surface 22 of the can 20 and/or the outer surfaces of the insulating sleeves 30. In particular, the end disks 40, 42 have recesses 44 and/or openings for the installation and fixing of the conductor tracks. In this way, the deformation and welding of the conductor tracks to form a winding head during the assembly of the electric machine can be simplified, because the end disks 40, 42 are used for fixing the conductor tracks. This method step can be performed in automated fashion with the aid of robots.

The stator component 100 is formed as a single piece and is composed of the stator laminated core 15 and the plastics workpiece 10 molded thereon. The stator component 100 forms a composite part that is distinguished by a major reduction of the components required. By virtue of the stator laminated core 15 being overmolded with plastic, the use of a large number of materials can be dispensed with, for example because there is no need for insulating paper strips for the grooves 32. The insulator sleeves 30 amply isolate the conductor tracks electrically from the stator laminated core 15, such that no further materials are necessary. In this way, the production process of the stator is simplified, because fewer components have to be assembled. Furthermore, recyclability is increased as a result.

A low weight is made possible due to the smaller number of components, and less expensive base materials. The firm connection of the stator laminated core 15 to the plastics workpiece 10 furthermore results in greater strength of the stator component 100. In this way, the wall thickness of the can 20 can be reduced, and this in turn leads to a reduction of the air gap between the stator and the rotor. A small air gap however increases the efficiency of the electric machine.

Manufacturing tolerances of the segments of the stator laminated core 15 can be compensated by virtue of cavities being filled with the plastics overmolding, such that the produced stator components 100 are distinguished by a high level of standardization and high surface quality. The stator component 100 can be equipped with two end disks 40, 42 arranged respectively at the upper and lower end regions of the can 20. Thus, the installation of the conductor tracks can be simplified. Altogether, the number of method steps can thus be reduced so that a more efficient production and a cost saving can be achieved. This leads overall to less expensive and more environmentally friendly production of an electric motor.

What is claimed is:

1. An electric machine comprising: a rotor and a stator, the stator having a stator laminated core (15) and a plastics workpiece (10) molded thereon, wherein the plastics workpiece (10) includes a can (20) radially inward of the stator laminated core (15), insulating sleeves (30) on an outer surface of the can (20), each of the insulating sleeves (30) having two side walls (34) projecting radially out from the can (20) and an outer wall (36) connecting ends of the sidewalls (34) remote from the can (20) so that a groove (32) is formed between the sidewalls (34) and the outer wall (36) of each of the insulating sleeves (30) for receiving conductive bars (39), end disks (40, 42) projecting radially outward from the can (20) and engaging opposite axial ends of the laminated core (15), the end disks (40, 42) being configured for inserting the conductive bars (39) into grooves (32).

2. The electric machine of claim 1, wherein the plastics workpiece (10) is composed of a magnetically neutral and electrically insulating plastic and is molded onto the stator laminated core (15) by an injection molding process or a transfer molding process.

3. The electric machine of claim 2, wherein the magnetically neutral and electrically insulating plastic is polyamide.

4. The electric machine of claim 2, wherein the magnetically neutral and electrically insulating plastic is polypropylene.

5. The electric machine of claim 2, wherein magnetically neutral and electrically insulating plastic is polystyrene.

6. The electric machine of claim 1, wherein segments of the stator laminated core (15) are arranged in the intermediate spaces (38) between the adjacent insulating sleeves (30).

7. The electric machine of claim 1, wherein the end disks (40, 42) are connected integrally to end surfaces of the insulating sleeves (30) and to the outer surface (22) of the can (20).

8. The electric machine of claim 1, wherein the end disks (40, 42) have recesses (44) and/or openings for the installation and fixing of the conductor bars.

9. A stator for an electric machine, comprising a stator laminated core (15) and a plastics workpiece (10) molded thereon, wherein the plastics workpiece (10) includes a can (20) radially inward of the stator laminated core (15), insulating sleeves (30) on an outer surface of the can (20), each of the insulating sleeves (30) having two side walls (34) projecting radially out from the can (20) and an outer wall (36) connecting ends of the sidewalls (34) remote from the can (20) so that e groove (32) is formed between the sidewalls (34) and the outer wall (36) of each of the insulating sleeves (30) for receiving conductive bars (39), end disks (40, 42) projecting radially outward from the can (20) and engaging opposite axial ends of the laminated core (15), the end disks (40, 42) being configured for inserting the conductive bars (39) into the grooves (32).

10. The stator of claim 9, wherein the plastics workpiece (10) is composed of a magnetically neutral and electrically insulating plastic and is molded onto the stator laminated core (15) by an injection molding process or a transfer molding process.

11. The stator of claim 10, wherein the magnetically neutral and electrically insulating plastic is polyamide.

12. The stator of claim 10, wherein the magnetically neutral and electrically insulating plastic is polypropylene.

13. The stator of claim 10, wherein magnetically neutral and electrically insulating plastic is polystyrene.

* * * * *